(12) United States Patent
Dunnwald

(10) Patent No.: US 9,718,621 B2
(45) Date of Patent: Aug. 1, 2017

(54) SEALING DEVICE FOR A BELT TRANSFER LOCATION

(71) Applicant: ScrapeTec GmbH, Kamp-Lintfort (DE)

(72) Inventor: Wilfried Dunnwald, Kamp-Lintfort (DE)

(73) Assignee: ScrapeTec GmbH, Kamp-Lintfort (DE)

( * ) Notice: Subject to any disclaimer, the term of this patent is extended or adjusted under 35 U.S.C. 154(b) by 0 days.

(21) Appl. No.: 14/898,886

(22) PCT Filed: Jun. 20, 2014

(86) PCT No.: PCT/EP2014/063014
§ 371 (c)(1),
(2) Date: Dec. 16, 2015

(87) PCT Pub. No.: WO2014/206878
PCT Pub. Date: Dec. 31, 2014

(65) Prior Publication Data
US 2016/0137423 A1 May 19, 2016

(30) Foreign Application Priority Data
Jun. 24, 2013 (EP) .................... 13173404

(51) Int. Cl.
*B65G 15/08* (2006.01)
*B65G 21/20* (2006.01)

(52) U.S. Cl.
CPC ......... *B65G 21/2081* (2013.01); *B65G 15/08* (2013.01)

(58) Field of Classification Search
CPC ........................... B65G 21/2081; B65G 15/08
USPC .......................... 198/497, 818, 836.1–836.4
See application file for complete search history.

(56) References Cited

U.S. PATENT DOCUMENTS

| | | | |
|---|---|---|---|
| 2,883,035 A | 4/1959 | Erisman | |
| 6,155,407 A | 12/2000 | Shelstad | |
| 8,668,077 B2 * | 3/2014 | Sundstrom | ........... B65G 47/763 198/499 |
| 2012/0318642 A1 | 12/2012 | Sundstrom | |

FOREIGN PATENT DOCUMENTS

| | | |
|---|---|---|
| CN | 1666937 A | 9/2005 |
| DE | 2416963 A1 | 10/1975 |
| DE | 3728624 C1 | 9/1988 |
| EP | 0539769 B1 | 12/1995 |
| JP | 10152214 A | 6/1998 |
| WO | 9109798 A1 | 7/1991 |

* cited by examiner

*Primary Examiner* — William R Harp
(74) *Attorney, Agent, or Firm* — The Webb Law Firm

(57) ABSTRACT

A sealing device for sealing the side regions of a conveyor belt having a sequence of sealing elements being arranged on either side of the longitudinal axis of the conveyor belt. The sealing elements are spaced apart and rest on the surface of the conveyor belt in a resilient manner, the individual sealing elements being arranged at an angle to the longitudinal axis of the conveyor belt and pointing in the direction of movement of the conveyor belt by their inner end. The sealing elements consist of strip-like guide ledges.

13 Claims, 1 Drawing Sheet

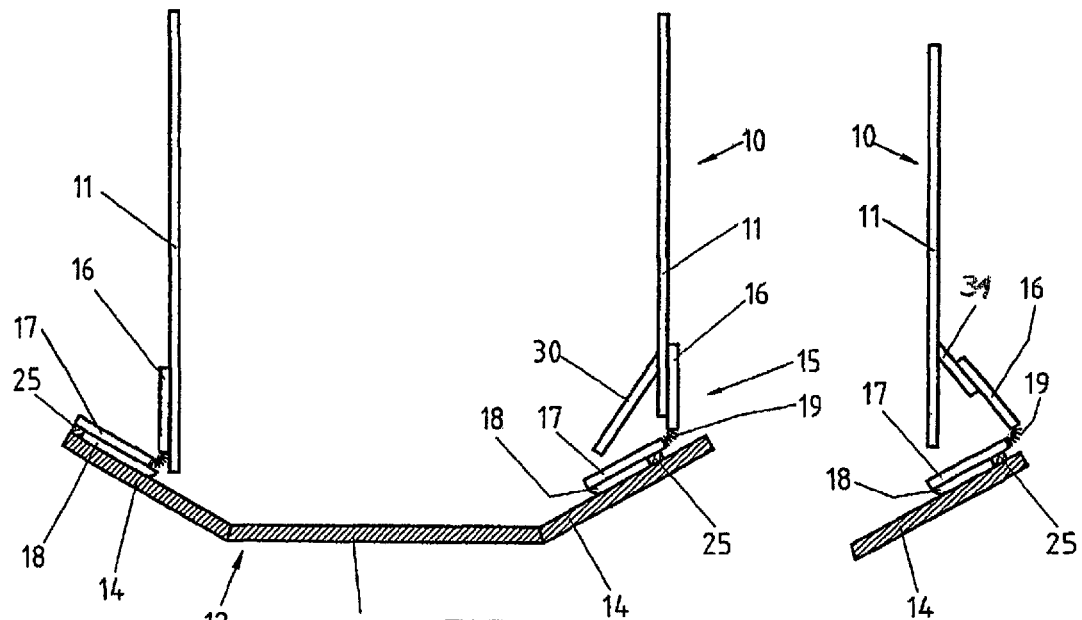
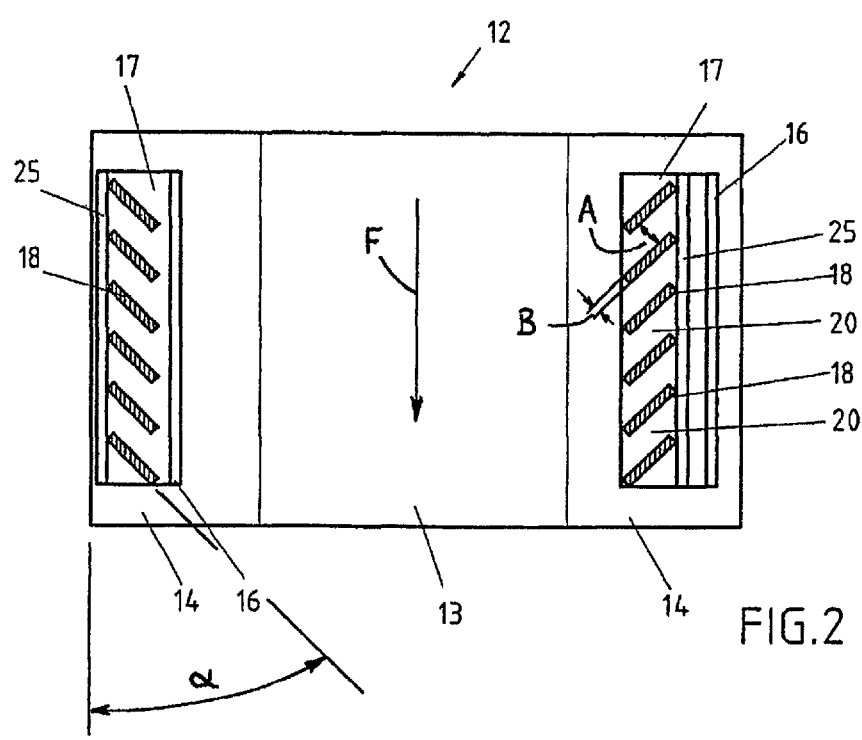

SEALING DEVICE FOR A BELT TRANSFER LOCATION

CROSS-REFERENCE TO RELATED APPLICATIONS

This application is the United States national phase of International Application No. PCT/EP2014/063014 filed Jun. 20, 2014, and claims priority to European Patent Application No. 13173404.8 filed Jun. 24, 2013, the disclosures of which are hereby incorporated in their entirety by reference.

BACKGROUND OF THE INVENTION

Field of the Invention

The invention relates to a sealing device for sealing the side regions of a conveyor belt, a sequence of sealing elements being arranged on either side of the longitudinal axis of the conveyor belt in the edge region of the conveyor belt in each case, which sealing elements are spaced apart and rest on the surface of the conveyor belt in a resilient manner, the individual sealing elements being arranged at an angle to the longitudinal axis of the conveyor belt and pointing in the direction of movement of the conveyor belt by their inner end.

Description of Related Art

A sealing device having the aforementioned features is known from JP 10152214 A in the application of a skirt for sealing a transfer chute against a conveyor belt which extends therebelow. Where the lower edges of transfer chutes for conveyor belts have to be sealed relative to the conveyor belts located therebelow in order to prevent conveyed material and/or trails of dust escaping, the abovementioned document JP 10152214 A proposes a sealing system which consists of sealing elements which are resiliently and pivotally suspended on a side wall of the transfer chute. The plate-like sealing elements rest on the surface of the troughed conveyor belt in a planar manner, groove-like depressions for connecting connection rods being formed in the surface of the sealing elements. This is intended to make it impossible for the material on the conveyor belt to fall off the side of the conveyor belt during transportation.

The known sealing device is disadvantageous in that, due to the sealing elements resting on the surface of the conveyor belt in a resilient manner, material can slide under the contact surface of the sealing elements and is then rolled under the sealing elements, which are resting on said conveyor belt surface in a planar manner, due to the movement of the conveyor belt relative to the sealing elements. This not only places strain on the surface of both the conveyor belt and the sealing elements due to the friction generated, but in fact, depending on the formation of the material to be conveyed, can also lead to sticking and adhering and the sealing elements can even be lifted off the conveyor belt, which can stop the sealing elements from working properly or at all.

Another design of a sealing device is described in WO 91/09798 A and consists of a retaining plate, which is attached to the outside of the side wall of a transfer chute, and a sealing element which is resiliently movable on said plate in a linear manner towards the conveyor belt which runs below the transfer chute. The sealing-lip-like sealing element, which consists of a flexible material, in particular an elastomeric plastics material, rests on the surface of the troughed conveyor belt by its front leading edge. This sealing device is disadvantageous in that, due to the sealing lip element resting on the conveyor belt by its end face, linear contact is made between the belt of the conveyor belt and the sealing element. This linear contact often causes grooves to form in the circulating conveyor belt, because even when a groove is just starting to form, conveyed material is deposited in the grooves, making the grooves deeper during further operation and at the same time leading to increased wear of the sealing element which interacts with the groove formed in this way. As a consequence, already-formed grooves and increasing wear of the linearly resting sealing element mean it is no longer ensured that the transfer point is properly sealed. In addition, linearly functioning sealing systems of this kind have to be readjusted more frequently due to wear and are not maintenance-free in this respect.

The object of the invention is to provide a seal of the type mentioned at the outset which ensures low wear of the conveyor belt and effective sealing properties at the same time.

SUMMARY OF THE INVENTION

The basic principle of the invention provides that the sealing elements consist of strip-like guide ledges, of which the contact surface, which rests on the conveyor belt, is designed to be narrow, compared to the spacing between the guide ledges, in a ratio of the width thereof to the spacing between the guide ledges of greater than 1:3, and that an end ledge is arranged, which extends along the outer side edges of the conveyor belt and connects the outer ends of the guide ledges.

In other words, the invention provides that a sequence of sealing elements is arranged on either side of the longitudinal axis of the conveyor belt, in the edge region of the conveyor belt in each case, which sealing elements are spaced apart and rest on the surface of the conveyor belt in a resilient manner, the individual sealing elements consisting of strip-like guide ledges which are arranged at an oblique angle to the longitudinal axis of the conveyor belt and point in the direction of movement of the conveyor belt by their inner end, wherein the guide ledges are narrow in that the ratio of the width of the particular guide ledge to the spacing between two of the guide ledges, between which a gap is formed, is greater than 1:3, and that an end ledge is arranged, which extends along the outer side edges of the conveyor belt and connects the outer ends of the guide ledges, and so the gap between the guide ledges is closed on the outside towards the edge region of the conveyor belt.

The invention is advantageous in that, as a result of the individual strip-like spaced-apart guide ledges and the ratio of the width of said ledges to the spacing therebetween, only a low surface pressure is produced in each case, which is advantageous in that the belt surface of the conveyor belt is correspondingly conserved. When the material on the conveyor belt is guided towards the centre of the conveyor belt in each case due to the oblique position, already known in the prior art, of the guide ledges in the conveying direction of the conveyor belt, the gaps formed between the guide ledges, which are narrow in relation to the spacing therebetween, prevent the possibility of material which gets under a guide ledge from being entrained over the extent of the sealing device. Rather, material pushed under a guide ledge in this way enters the gap formed between said guide ledge and the next guide ledge, where it is guided back to the centre of the conveyor belt due to the oblique position of the subsequent guide ledge. Therefore, the gaps between the guide ledges are also designed to be large enough, in relation to the contact width thereof, for material to be readily conducted away in this way and so that material does not collect and possibly stick in the gaps. In addition, the gaps are closed by the end ledge which extend at the outer ends of the guide ledges, and so no material can escape here. If an air flow were possible between the end ledge and the conveyor belt due to the end ledge becoming worn, during the conveying operation an air flow would thus be forced between the guide ledges to the centre of the conveyor belt, and therefore an air movement of this type also assists in guiding conveyed material and dust back towards the conveyor belt and in this respect improves the seal of the transfer region. Optionally, this effect can also be brought about to the desired extent by the end ledge being attached at a small spacing from the surface of the conveyor belt. Finally, the maintenance requirements of the sealing device are reduced by the fact that, if the guide ledges experience wear, the seal is automatically adjusted primarily by means of the weight of the guide ledges resting on the conveyor belt.

The sealing device according to the invention can be used to continuously seal the sides of a conveyor belt and to seal the transfer region from a transfer chute, connected to a conveying means, to a conveyor belt running therebelow. In this case, the sealing device is retained on either the side structure of a conveyor frame supporting the conveyor belt or the side wall of a transfer chute.

The risk of the sealing device becoming worn is reduced if, according to one embodiment, the guide ledges, which form a rectangle shape together with the longitudinal axis extending in the direction of movement of the conveyor belt, rest on the surface of the conveyor belt in a planar manner.

According to one embodiment of the invention, the individual guide ledges form an angle of between 15° and 45° with the outer edge of the conveyor belt, an expedient embodiment providing that the individual guide ledges form an angle of 30° with the outer edge of the conveyor belt.

According to one embodiment of the invention, the inner ends of the guide ledges, which ends point towards the centre of the conveyor belt, are formed having a curvature or chamfer which projects upwards on the conveyor belt from the lower contact surface of said ledges.

In order to retain the guide ledges in the transfer region, a plurality of guide ledges can be fastened to a support which is retained on the transfer chute and extends over a portion of the conveyor belt.

The guide ledges are expediently made of hard metal or another wear-resistant material.

Where one embodiment of the invention provides that the strip-like support is made of a flexible material, the support can be formed as a thin rubber belt or plastics belt or can be made of any other suitable fabric. Where the guide ledges, which are preferably made of hard metal or a wear-resistant material, are fastened to a support of this type, they can be bonded, screwed or vulcanised to the flexible support or otherwise fastened thereto in a suitable manner.

According to one embodiment of the invention, the support is retained, together with the guide ledges attached thereto, on a conveyor frame, which supports the conveyor belt, by means of a connection which allows for free mobility, it being possible in particular for the support to be supported by a retainer connected to a side structure of the conveyor frame and to be movably retained on the retainer.

Depending on the position of the side structure of the conveyor frame or of the side wall of a transfer chute relative to the conveyor belt running therebelow, according to one embodiment of the invention, the retainer can be fastened to the side structure or side wall which ends above the troughed conveyor belt at a spacing from the surface of the conveyor belt, and the support can rest on the edge region of the conveyor belt in a position which is angled relative to the retainer towards the outer edge of the conveyor belt.

In this case, in order to protect the connection between the side structure and the retainer, the side structure can project beyond the connection in the direction of the conveyor belt and the longitudinal extent of the guide ledges can be measured up to the connection or therebeyond.

As an alternative, the retainer can be fastened to the side structure or side wall of the transfer chute which ends above the troughed conveyor belt and the support can rest on the side region of the conveyor belt in a position which is angled relative to the retainer towards the centre of the conveyor belt.

Likewise, in this embodiment, in order to protect the connection between the retainer and the support, a cover plate which faces away from the side structure towards the support can be attached to the inner side of the side structure.

BRIEF DESCRIPTION OF THE DRAWINGS

Embodiments of the invention are shown in the drawings and are described in the following. In the drawings:

FIG. 1 is a front view of a conveyor belt having sealing devices arranged in different ways on the longitudinal sides thereof;

FIG. 1a is a partial view of another embodiment of a sealing device for a conveyor belt in accordance with FIG. 1; and FIG. 2 is a plan view of the subject matter of FIG. 1.

DETAILED DESCRIPTION OF THE INVENTION

A troughed conveyor belt 12 is supported by the side structure 11 of a conveyor frame 10 in a manner not shown in more detail. Alternatively, the side structure 11 can also be the side wall of a transfer chute, below which the conveyor belt 12 runs at a spacing therefrom. The troughed conveyor belt 12 comprises a central region 13 and side regions 14 which ascend obliquely on either side. In order to seal the gap between the end of each side wall 11 and the surface of the associated side region 14 of the conveyor belt 12 in each case, a sealing device 15 is provided in each case, wherein, although the two sealing devices 15 each have the same technical construction, they are arranged so as to be assigned to the side regions 14 of the conveyor belt 12 in a different manner in each case.

Each sealing device 15 consists of a strip-shaped support 17 which extends in the longitudinal direction of the conveyor belt over a predetermined longitudinal extent and is retained on the lower end of a retainer 16, which is attached to the outside of each side structure 11, by means of a connection 19, such that the strip-shaped support 17 is freely movable in order to orient the retainer 16 or the side structure 11 of the conveyor frame 10. Where the retainer 16 and/or the support 17 can be made of a flexible or thin-walled material, for example rubber or a suitable plastics material, the connection can be formed by bending the correspondingly selected material of the support 17 and/or the retainer 16 or alternatively even by a hook seam between the two aforementioned parts. When the support 17 or retainer 16 has a more rigid design, a hinge can also be arranged as a connection between the retainer 16 and the support 17.

Guide ledges 18 are attached to the lower side, facing the conveyor belt 12, of the strip-shaped support 17, the arrangement of which ledges can be seen in detail in FIG. 2. The guide ledges 18 having a rectangular shape are spaced apart in each case, with gaps 20 being formed therebetween. Where, according to the invention, the ratio of the width of the guide ledges to the spacing therebetween is intended to be greater than 1:3, the spacing between the guide ledges 18 is multiple times the width of the guide ledges 18. If, for example, the width of two of the guide ledges 18 resting on the conveyor belt 12 is 10 mm (i.e. the particular guide ledge 18 has a width of 5 mm in this example), the spacing therebetween should therefore be at least 15 mm; however, a larger spacing, for example of the order of 150 mm or a spacing between the guide ledges 18 which is greater than 10 times the particular guide ledge width, is expedient. In FIG. 2, the width of the particular guide ledge 18 is denoted by B, while the spacing between two guide ledges 18 between which a gap 20 is formed is denoted by A.

Due to their specific arrangement, the guide ledges 18 rest on the conveyor belt 12 with a comparatively large contact surface, and so, due to the resulting low surface pressure, the sealing device 15 has belt-conserving properties. Due to wear, the guide ledges 18 are preferably made of hard metal, these hard metals being fastened on the support 17, which is formed as a thin rubber belt or plastics belt or consists of another suitable fabric, by means of bonding, screwing, vulcanising, etc. When wear occurs during long-term operation of the sealing device, due to the movable connection of the support 17 to the retainer 16 the way in which the guide ledges rest on the belt is readjusted in an automatic and thus maintenance-free manner as a result of the applied weight or even the bending force emanating from the bend in the material.

In FIG. 2, the arrow F indicates the direction of movement or conveying direction of the conveyor belt 12. In particular, FIG. 2 shows that the individual guide ledges 18 form an angle $\alpha$ with the outer edge of the conveyor belt 12. In the embodiment shown in FIG. 2, the angle $\alpha$ is approximately 45°. The angle $\alpha$ can, however, also be selected to be smaller; it is preferably between 15° and 45°.

This position, which is oblique to the longitudinal axis of the conveyor belt 12 and is oriented in the direction of the conveying direction of the conveyor belt 12, means that, on the one hand, conveyed material which passes from the conveyor belt 12 into the gaps 20 between the guide ledges 18 or dust which gets into said gaps is guided back towards the conveyor belt 12. The same also applies to conveyed material which, under certain operating conditions, gets under a guide ledge 18 or a group of guide ledges 18 fastened to a support 17. This material is not rolled underneath the guide ledges 18 over the length of the entire sealing device, but rather, after entering a gap 20 existing between two guide ledges 18, is guided back towards the centre of the conveyor belt 12 by the next guide ledge 18 in the conveying direction. In order to prevent conveyed material which has entered the gaps 20 from escaping over the side edges of the conveyor belt 12, the outer ends of the guide ledges 18 are interconnected by means of an end ledge 25 which extends in parallel with the outer edge of the conveyor belt 12, and so, in this regard, the gaps 20 are closed on the outside. In this case, similarly to the guide ledges 18, the end ledges 25 can rest on the surface of the conveyor belt 12. As is not shown in more detail, however, the end ledges 25 may also be arranged at a small spacing from the surface of the conveyor belt 12, and therefore an air flow into the gaps 20 between the guide ledges 18 is possible. As a result of the movement of the loaded conveyor belt 12, suction is created, and therefore an air flow is caused between the guide ledges 18 in the direction of the conveyor belt 12, which air flow constitutes a natural barrier to stop conveyed material and/or dust from escaping from the transfer region and assists in guiding conveyed material and/or dust back to the conveyor belt 12.

The drawing shows different arrangements of the strip-shaped support 17 comprising guide ledges 18 on both the left-hand side of the conveyor frame 10 comprising the conveyor belt 12 and the right-hand side thereof. Where the strip-shaped supports 17 are each held on the ends of the retainer 16 by means of a connection 19 which allows for free mobility, on the left-hand side of the view the support 17 is arranged in a position which is angled relative to the retainer 16 towards the outer edge of the conveyor belt 12, and rests on the edge region of the conveyor belt 12, while on the opposite, right-hand side of the conveyor frame 10 and conveyor belt 12, an inverted arrangement of the strip-shaped support is shown, within the context of which the support 17 rests on the side region 14 of the conveyor belt 12 in a position which is angled relative to the retainer 16 towards the centre of the conveyor belt 12.

Where it is expedient to protect the connection 19 between the retainer 16 and the support 17, on the right-hand side of the view in FIG. 1 an additional cover plate 30 is attached to the inner side of the side structure 11 and extends from the side structure 11 towards the support 17 and in this case covers the connection 19 from the material on the conveyor belt 12. Extending the side structure 11 in the direction of the conveyor belt 12 up to the connection 19 or beyond said connection, as can be seen on the left-hand side of the conveyor belt 12, and dimensioning the longitudinal extension of the guide ledges 18 to extend up to the connection 19 or beyond said connection serve the same purpose. As a result, the connection 19 is also effectively protected.

In the embodiment shown in FIG. 1$a$, the support 17 and guide ledges 18 are arranged in the same way as on the right-hand side of the view in FIG. 1. Where, in the embodiment shown in FIG. 1, the guide ledges rest closer to the conveyor belt centre and as a result part of the conveyor belt cross section is wasted, FIG. 1$a$ shows a solution in which the retainer 16 is attached to the outside of the side structure 11 by means of a corresponding support plate 31 either obliquely or at an angle, and so the guide ledges 18 slide until they reach the outer edge of the conveyor belt 12 as a result. At the same time, the connection 19 therefore lies outside the loading cross section of the conveyor belt 12, which is also delimited by the side structure 11, and is therefore protected.

The features of the subject matter of these documents disclosed in the above description, the claims, the abstract and the drawings can be essential for implementing the invention in its various embodiments either individually or in any combination.

The invention claimed is:

1. A sealing device for sealing side regions of a conveyor belt, comprising:
   a strip-like support which extends in a longitudinal axis of the conveyor belt and comprises a sequence of sealing elements being arranged on either side of the longitudinal axis of the conveyor belt in an edge region of the conveyor belt in each case, which sealing elements are spaced apart from another with a distance forming a gap and rest with a contact surface on a surface of the conveyor belt in a resilient manner, the individual sealing elements being arranged in an oblique position at an angle to the longitudinal axis of the conveyor belt and pointing in a direction of movement of the conveyor belt by their inner end, wherein the sealing elements consist of strip-like guide ledges, wherein the guide ledges are designed to be narrow, compared to mutual spacing between the guide ledges, in a ratio of a width of said ledges to the mutual spacing between the guide ledges of greater than 1:3, and in that an end ledge is arranged, which extends along outer side edges of the conveyor belt and connects outer ends of the guide ledges and closes a gap between the guide ledges on the outside.

2. The sealing device according to claim 1, wherein the individual guide ledges form an angle of between 15° and 45° with the outer edge of the conveyor belt.

3. The sealing device according to claim 2, wherein the individual guide ledges form an angle of 30° with the outer edge of the conveyor belt.

4. The sealing device according to claim 1, wherein the inner ends of the guide ledges, which ends point towards a centre of the conveyor belt, are formed having a curvature or chamfer which projects upwards on the conveyor belt from a lower contact surface of said ledges.

5. The sealing device according to claim 1, wherein the support extends over a portion of the conveyor belt and is retained on a transfer chute, wherein in each case a plurality of guide ledges are fastened to the support.

6. The sealing device according to claim 1, wherein the guide ledges attached to the support are made of a wear-resistant material.

7. The sealing device according to claim 1, wherein the strip-like support is made of a flexible material.

8. The sealing device according to claim 1, wherein the support, together with the guide ledges attached thereto, is retained on a conveyor frame, which supports the conveyor belt, by means of a connection which allows for free mobility.

9. The sealing device according to claim 8, wherein the support is supported by a retainer connected to a side structure of the conveyor frame and is movably retained on the retainer.

10. The sealing device according to claim 9, wherein the side structure of the conveyor frame ends above the troughed conveyor belt at a spacing from the surface of the conveyor belt, wherein the retainer is fastened to the side structure of the conveyor frame and the support rests on the edge region of the conveyor belt in a position which is angled relative to the retainer towards the outer edge of the conveyor belt.

11. The sealing device according to claim 10, wherein, in order to protect the connection between the support and the retainer, the side structure projects beyond the connection in the direction of the conveyor belt and a longitudinal extent of the guide ledges is dimensioned to extend up to the connection or therebeyond.

12. The sealing device according to claim 9, wherein the side structure of the conveyor frame ends above the troughed conveyor belt, wherein the retainer is fastened to the side structure of the conveyor frame, and the support rests on the side region of the conveyor belt in a position which is angled relative to the retainer towards a centre of the conveyor belt.

13. The sealing device according to claim 12, wherein, in order to protect the connection between the retainer and the support, a cover plate which faces away from the side structure towards the support is attached to the inner side of the side structure.

* * * * *